United States Patent [19]

Rule et al.

[11] 3,789,537

[45] Feb. 5, 1974

[54] MULTIPLE ROD ELECTRODES

[75] Inventors: Clinton Rule, Beverly Farms; Peter Adrian Rubel, Concord, both of Mass.

[73] Assignee: Rule Industries, Inc., Gloucester, Mass.

[22] Filed: Nov. 22, 1971

[21] Appl. No.: 200,677

[52] U.S. Cl. .................................................. 43/112
[51] Int. Cl. ............................................. A01m 1/22
[58] Field of Search 43/112, 98, 99; 287/20.1, 20.3, 287/20.5

[56] References Cited
UNITED STATES PATENTS 2,159,618  5/1939  Lindsley................................. 43/112
473,567   4/1892  Curtis .................................. 287/20.3

Primary Examiner—Warner H. Camp
Attorney, Agent, or Firm—William N. Anastos; Barry R. Blaker

[57] ABSTRACT

Fabrication of the multiple rod electrode involves a particular deformation of a portion of each electrode rod. The deformed portions of the electrode rods are then press fitted into receiving apertures provided therefor in a bus bar.

8 Claims, 3 Drawing Figures

Patented Feb. 5, 1974

MULTIPLE ROD ELECTRODES

FIELD OF THE INVENTION

The present invention relates generally to electrode construction and more specifically to multiple rod electrode construction.

BACKGROUND OF THE INVENTION AND PRIOR ART

Various electrical apparatuses are known in which there are conventionally employed multiple rod electrodes. For instance, multiple rod electrode arrangements find usage in electrostatic dust collection apparatus and insect electrocutors. As an example of the latter, there is shown in FIG. 1 a frontal view of a typical insect electrocutor. Referring to said FIG. 1, the electrode grid 2 generally comprises at least two multiple rod electrodes 5 and 10. Electrode 5 comprises bus bar 6 and a plurality of spaced parallel rods 7 extending perpendicularly therefrom. Similarly, electrode 10 comprises bus bar 11 and a plurality of rods 12. Bus bars 6 and 11 are suitably positioned so as to alternate their respective rods 7 and 12 with one another in spaced apart relationship throughout the span of grid 2. Additional support for rods 7 and 12 may be had by providing one or more support strips 19 composed of a dielectric material such as sintered silica ceramic or polytetrafluoroethylene. Appropriately spaced apertures are provided along the length of each said strip 19 to receive and support rods 7 and 12.

Housing 22 provides a protective enclosure for high voltage supply means (not shown) which means can be a step-up transformer, one side of the secondary winding thereof being connected to bus bar 6 by conductor 8 and the other side being connected to bus bar 11 by conductor 13. Additionally, the insect electrocutor may comprise attractant light means such as fluorescent tube 24 which draws its power from an appropriately matched ballast (not shown) residing within housing 22. Stand-off insulators 26 and 28 provide mechanical attachment of grid 2 to housing 22 and electrical isolation therebetween. In operation, an insect flying sufficiently close to or coming into contact with any of rods 7 or 12 creates a dielectric breakdown between said rod and its neighbor. Thus, an arc is struck between the neighboring rods and the insect constituting the principal intermediate conductor. As a result the insect is killed or incinerated. Further details concerning the design and construction of such electrocutors may be had by reference to U. S. Pat. No. D. 206,072, Hill, Oct. 25, 1966; U. S. Pat. No. 2,941,328, Streat, June 20, 1960; and U. S. Pat. No. 2,177,846, Swangren, Oct. 31, 1939.

Various difficulties are normally involved in the fabrication of multiple rod electrodes such as described above. A major problem area resides in attachment of the plurality of rods to the bus bar in a convenient and rapid manner while concomitantly providing requisite mechanical and electrical integrity of attachment and parallel disposition of the rods with respect to one another. For instance, welding, brazing or soldering of the rods to the bus bar ordinarily requires that the rods be first jigged in order to attain proper spacing and parallelism during fabrication. Thus, this method ordinarily represents a time consuming and uneconomic method of construction. Moreover, the multiple heating steps required can result in sufficient stressing of the bus bar so as to deform same and thereby ultimately detrimentally affect the parallel disposition of the rods despite preliminary jigging thereof.

Another potentially suitable construction method involves drilling and threading of the bus bar to provide a plurality of threaded apertures therein. Each of the rods is correspondingly threaded and thereafter screwed into the threaded apertures of the bus bar. Again, however, this method of construction is complex and time consuming, particularly in the threading steps required prior to assembly.

Finally, it has been proposed to provide slightly oversize rods and to simply press fit said rods into slightly undersize apertures provided in the bus bar. While this method would enjoy beneficial characteristics of simplicity and rapidity of fabrication, this method generally leads to severe distortion of the bus bar by virtue of the total incremental strains imposed thereupon by each of the multiple rods so fitted. Accordingly, the requisite parallelism of the rods is ordinarily substantially degraded or lost altogether.

In accordance with the present invention, however, there is provided a simple and rapid method for fabrication of multiple rod electrodes wherein the above problems are substantially overcome.

OBJECTS OF THE INVENTION

It is a principal object of the invention to provide a novel multiple rod electrode construction characterized by its mechanical and electrical integrity and lack of distortion.

It is another object of the invention to provide a novel process for the fabrication of multiple rod electrodes characterized by its simplicity and rapidity.

Other objects and advantages of the invention will in part be obvious and will in part appear hereinafter.

THE DRAWINGS

As mentioned previously, FIG. 1 is a frontal view of a typical insect electrocutor employing multiple rod electrodes of the type producible by the present invention.

GENERAL DESCRIPTION OF THE INVENTION

The multiple rod electrodes of the invention are fabricated by:

(A) providing a bus bar having a plurality of apertures therethrough;

(B) providing a plurality of rods each of which bears on the shaft thereof an essentially symmetrical deformed portion, said portion comprising longitudinally oriented protuberances having a sufficient dimension thereacross to provide a press fit relationship thereof in the intended receiving aperture of the bus bar; and (C) seating each said rod into its respective receiving bus bar aperture so that 65 to 85 percent of the length of said aperture is filled with said deformed portion on the rod.

DETAILED DESCRIPTION OF THE INVENTION

Figure 1:
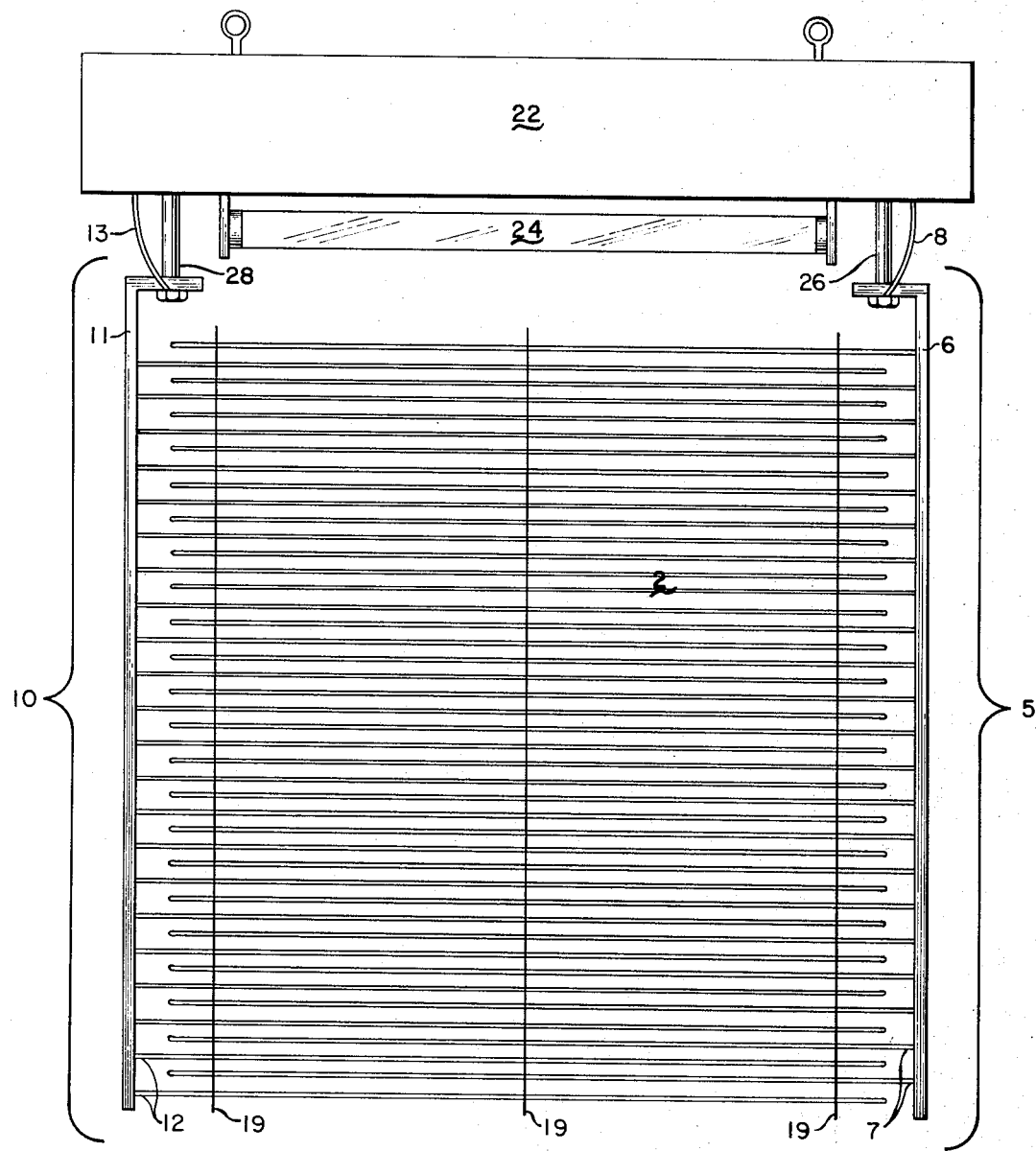
Figure 2:
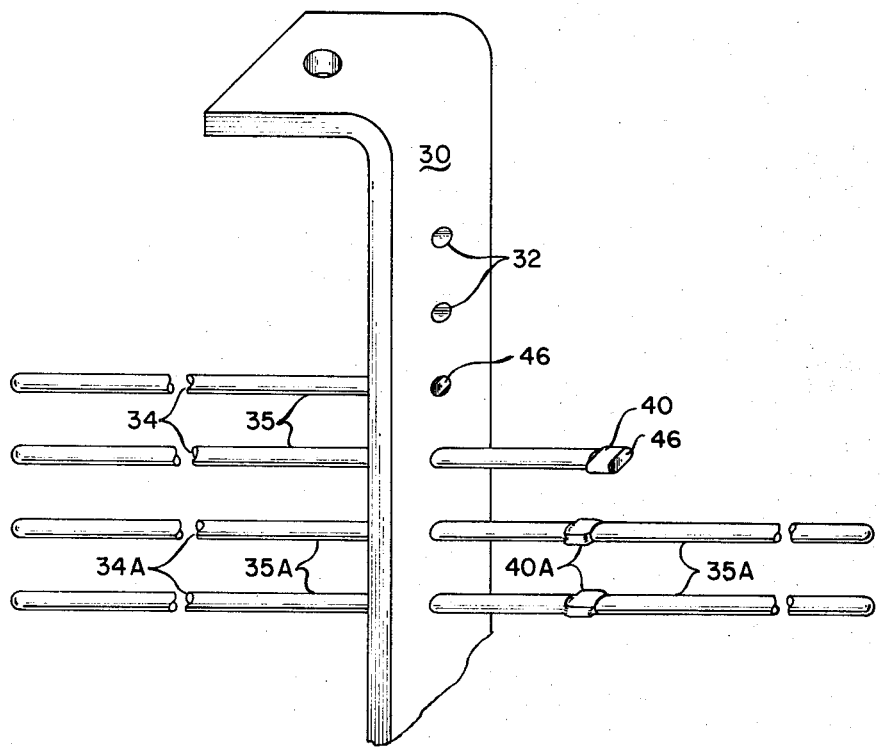
FIG. 2 is a perspective schematic view of a multiple rod electrode of the invention shown in a partial state of assembly and further showing certain preferred embodiments thereof.
Figure 3:
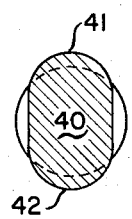
FIG. 3 is a schematic, diagrammatic, cross-sectional view of a portion of an electrode rod suitably deformed for use in the invention.

Referring now particularly to FIGS. 2 and 3, wherein like reference numerals refer to like structural features, bus bar 30 is composed of metal strap or bar stock and is drilled, punched, reamed or otherwise suitably provided along its length with spaced apertures 32 therethrough. Generally, at least ten such apertures 32 will be provided. The multiple rod electrode construction of the present invention is particularly advantageous, however, where the number of rod receiving apertures 32 (and rods 34) provided in bus bar 30 is at least twenty. The thickness of bus bar 30 can vary substantially, for instance from about 1/8 inch to about 1 inch. Normally, the thickness of the bus bar 30 will be the same as the lengths of apertures 32 provided therethrough (absent counter-boring, bushing or other modifying steps which could effectively alter the lengths of said apertures 32 relative to the thickness of bus bar 30). Accordingly, said bus bar 30 thickness may normally be conveniently taken as the aperture 32 length in determining appropriate length and penetration dimensions for deformed portions 40 of rods 34.

Each rod 34 comprises a generally elongate cylindrical shaft 35, said shaft 35 having a deformed portion 40 thereon. The diameter of shaft 35 is preferably sufficiently small as to allow at least a slip fit thereof through its receiving aperture 32. The deformed portion 40 is essentially symmetrical across the cross-section thereof and comprises longitudinally oriented protuberances 41 and 42. The width of deformed portion 40 across protuberances 41 and 42 is sufficient to provide a press fit relationship thereof with aperture 32.

The minimum length of deformed portion 40 to be employed is dictated entirely by the length of aperture 32. For the purposes of the present discussion suffice it to say that the length of deformed portion 40 of shaft 35 will be at least sufficient to fill 65 to 85 percent of the length of receiving aperture 32.

Deformed portion 40 may be located at any desired location along the length of each shaft 35. Normally, however, said deformed portion 40 will be located at the terminus 46 of shaft 35 such that, when pressed home to proper seating depth into receiving apertures 32, shaft 35 will project through one side of bus bar 30 while said terminus 46 will be flush with the other side. Alternatively, as shown in the lower part of FIG. 2, shafts 35-A may bear deformed portions 40-A at any desired location intermediate their lengths. In this specific embodiment shafts 35-A will project from both sides of bus bar 30 when assembled.

The particular forming step by which deformed portions 40 are formed is not normally critical and various suitable methods will be apparent to those skilled in the metal forming arts. We have found, however, that punch pressing represents a particularly convenient forming method susceptible of rapid production rate and accurate control of the geometry and dimensions of the finished product.

In the assembly of shafts 35 and 35-A to bus bar 30, referring now to FIG. 2 it is of critical importance that the penetration of press fitted deformed portions 40 and 40-A into apertures 32 be sufficient to fill apertures 32 to between about 65 and about 85 percent of the length of apertures 32. Preferably, apertures 32 will be filled to between about 70 and about 80 percent of their length. When apertures 32 are filled to an extent either substantially greater than about 85 percent or less than about 65 percent of their length, e.g., 90 percent or 50 percent, bus bar 30 can be significantly distorted or bowed by the incremental stresses imposed thereupon. Said bowing, of course, results in destruction of the necessary parallel orientation of rods 34. Surprisingly, however, when the above-disclosed dimensional and penetration criteria are met, such distortion of bus bar 30 does not occur to any detrimental extent, if at all.

Assembly of the multiple rod electrodes of the invention is achieved by insertion of shafts 35 into apertures 32 and press fitting of deformed portions 40 into their respective apertures. Generally speaking, the specific order of assembly of shafts 35 to bus bar 30 is of little consequence. As a matter of convenience, however, it is generally desirable that said assembly be achieved in a serial manner. Also, no specific rotational orientation of deformed portions 40 with respect to apertures 32 need be effected in order to achieve the objects and advantages of the invention. Indeed, this lack of criticality with respect to deformed portion 40/apertures 32 orientation represents yet another advantage of the invention in that it further speeds and simplifies assembly of the multiple rod electrode.

Materials of construction suitable for use in the multiple rod electrode construction of the invention will generally be obvious to those skilled in the art. Generally speaking, the principal requirements of said materials are that they be suitably electrically conductive and that they be sufficiently ductile so as to allow both the performance of deformed portions 40 of shafts 35 and of press fitting thereof into apertures 32.

Examples of generally suitable materials of construction are: brass, bronze, copper, aluminum and alloys thereof, iron, mild steels, stainless steels, etc. Desirably, the materials of construction for bus bar 30 and rods 34 will be the same or least be so chosen as to present little or no danger of galvanic corrosion occurring therebetween. Aluminum based alloys have been found to be a particularly desirable class of material of construction.

In a specific example of the multiple rod electrode construction of the present invention, there is provided a bus bar 30 composed of 6061-T5-E 38 aluminum alloy bar stock of 18 inch × 0.50 inch × 0.25 inch dimensions. Said bus bar 30 is provided with twenty-five perpendicularly oriented apertures 32 spaced at center to center intervals of 0.625 inch along the midline of its width, each said aperture 32 being 0.127 inch in diameter. Rods 34 each comprises an extruded twenty-seven inch length of aluminum alloy rod stock having a shaft 35 diameter of 0.125 inch. Terminus 46 of each shaft 35 is provided with a punch pressed symmetrical deformed portion 40 having a cross-sectional dimension across protuberances 41 and 42 of 0.134 inch, and a length of 0.188 inch. In serial order, each rod 34 is assembled to bus bar 30 by inserting shaft 35 through its aperture 32 and then pressing home the deformed portion 40 until terminus 46 is flush with the bus bar. Accordingly, the depth of penetration of the deformed portions 40 into apertures 32 is about 0.188 inch, which depth represents about 75 percent of the 0.250 inch lengths of apertures 32. The structural and electrical integrity of the completed electrode is excellent and the full complement of twenty-five rods 34 thereof are disposed in a substantially coplanar and parallel manner with no visually discernible distortion of bus bar 30.

Certain modifications of the invention will become apparent to those skilled in the art and the illustrative details disclosed herein are not intended to be construed as imposing unnecessary limitations on the invention. For instance, it is obvious that many of the advantages of the invention can be achieved even when a minor proportion of the full complement of rods, e.g., 20 percent or less, are attached to the bus bar by other methods or constructions including those mentioned in the BACKGROUND section of the instant disclosure. Generally, however, it is much more convenient that substantially all of the rods be attached to the bus bar in accordance with the construction of the invention.

What is claimed is:

1. A multiple rod electrode construction comprising
A. a bus bar having a plurality of spaced apart rod receiving apertures therethrough, and
B. a plurality of rods extending from said apertures, said rods each comprising
   i. a generally cylindrical elongate shaft portion,
   ii. an essentially symmetrically deformed portion comprising longitudinally oriented protuberances having a width thereacross sufficient to provide a press fit relationship thereof with its receiving aperture and having a length of at least about 65 percent of the length of its receiving aperture, and
   iii. wherein said deformed portion is seated in its receiving aperture to a depth of between about 65 and about 85 percent of the length of said aperture.

2. The multiple rod electrode construction of claim 1 wherein the deformed portion of each rod is seated in its receiving aperture to a depth of between about 70 and about 80 percent of the length of said aperture.

3. The multiple rod electrode construction of claim 1 wherein the number of apertures and corresponding rods is at least twenty.

4. The multiple rod electrode construction of claim 1 wherein the deformed portion of said rods is located at the terminus thereof.

5. The multiple rod electrode construction of claim 4 wherein said terminus is flush with the exterior surface of the bus bar.

6. The multiple rod electrode construction of claim 1 wherein the deformed portion of said rods is located at an intermediate position along the length of said shaft portion.

7. The multiple rod electrode construction of claim 1 wherein the material of construction employed is an aluminum alloy.

8. The multiple rod electrode construction of claim 1 wherein the diameter of said shaft portion is sufficiently smaller than the diameter of its receiving aperture to provide at least a slip fit therethrough.

* * * * *